US 6,603,108 B2

(12) United States Patent
Hou et al.

(10) Patent No.: US 6,603,108 B2
(45) Date of Patent: Aug. 5, 2003

(54) IMAGE SENSING MODULES FOR PORTABLE OPTICAL SCANNERS

(75) Inventors: Alpha Hou, San Jose, CA (US); Chengwu Gu, Guang Dong (CN)

(73) Assignee: Syscan Technology (Shenzhen) Co. Limited, Guang Dong (CN)

( * ) Notice: Subject to any disclaimer, the term of this patent is extended or adjusted under 35 U.S.C. 154(b) by 248 days.

(21) Appl. No.: 09/829,259

(22) Filed: Apr. 9, 2001

(65) Prior Publication Data

US 2002/0145104 A1 Oct. 10, 2002

(51) Int. Cl.$^7$ ................................................ H01L 27/00
(52) U.S. Cl. ..................... 250/208.1; 250/235; 358/473
(58) Field of Search ............................ 250/208.1, 221, 250/234–235, 239, 566; 235/454, 456, 462.42–462.45, 462.49, 472.01–472.03, 485; 358/471–474, 673, 412, 514; 382/313–314, 321, 323, 140; 348/262, 265, 300

(56) References Cited

U.S. PATENT DOCUMENTS

| 5,301,243 | A | * | 4/1994 | Olschafskie et al. ........ 382/314 |
| 5,574,804 | A | * | 11/1996 | Olschafskie et al. ........ 382/313 |
| 6,005,681 | A | * | 12/1999 | Pollard ........................ 358/473 |
| 6,036,095 | A | * | 3/2000 | Seo ........................ 235/472.01 |
| 6,037,584 | A | * | 3/2000 | Johnson et al. ............. 250/235 |
| 6,104,845 | A | * | 8/2000 | Lipman et al. ............. 382/313 |

* cited by examiner

Primary Examiner—Kevin Pyo
Assistant Examiner—Seung Sohn
(74) Attorney, Agent, or Firm—Joe Zheng

(57) ABSTRACT

Distinct designs are provided to reduce dimensions of an image sensing module without affecting the sizes of the original individual components in the image sensing module. According to one embodiment, a mirror is mounted before an optical focus system and used to collect and redirect reflected light from a scanning object being illuminated by an illumination source in the image sensing module, wherein the scanning object is parallel to the optical focus system.

4 Claims, 4 Drawing Sheets

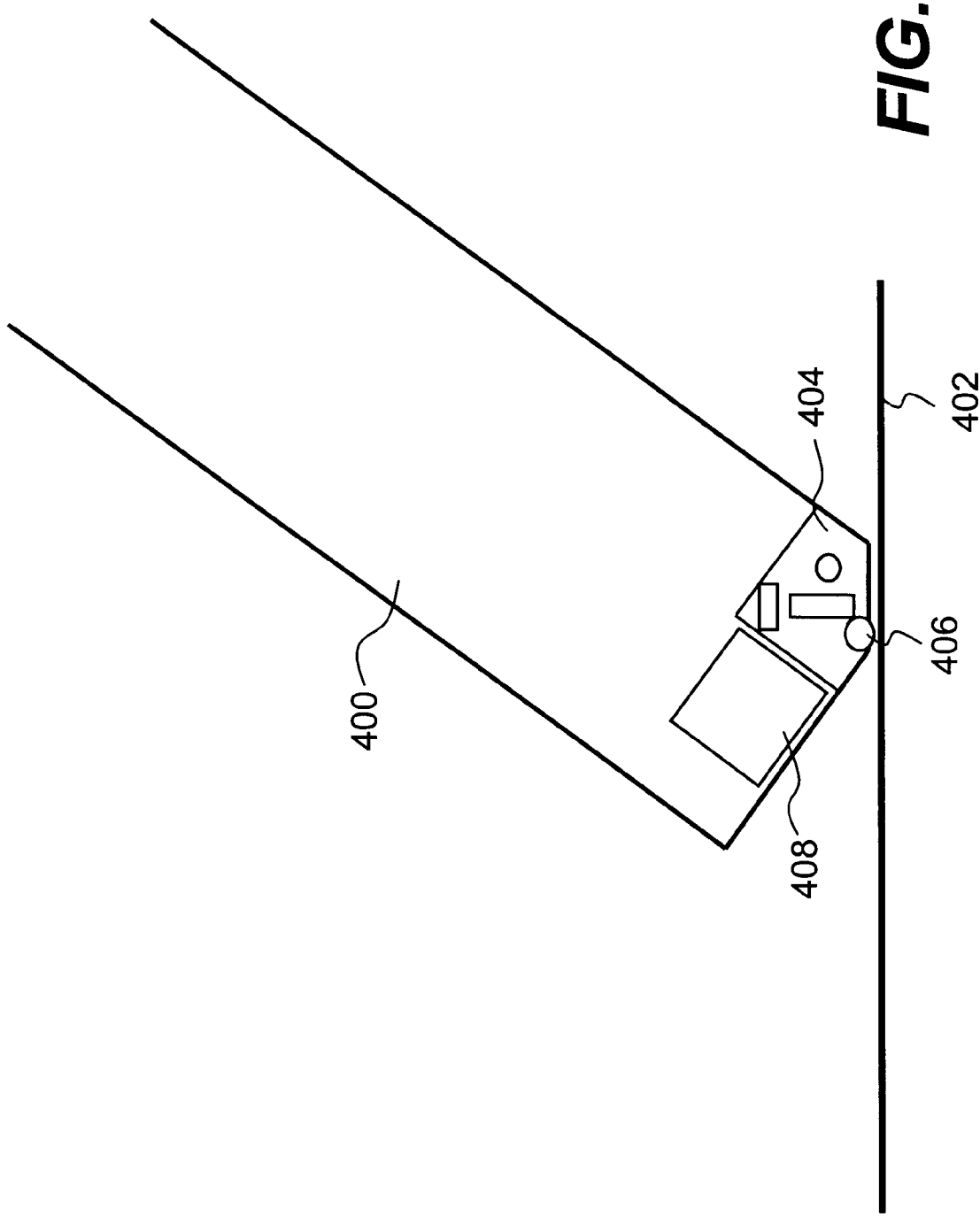

IMAGE SENSING MODULES FOR PORTABLE OPTICAL SCANNERS

CROSS REFERENCE TO RELATED APPLICATIONS

The present invention is related to commonly assigned U.S. Pat. No. 6,054,707, entitled "Portable scanners capable of scanning both opaque and transparent materials", which is hereby incorporated by reference.

BACKGROUND OF THE INVENTION

1. Field of the Invention

The present invention generally relates to image sensing modules for optical imaging devices and more particularly relates to image sensing modules practically suitable for being integrated into portable computing devices, wherein the portable computing devices may include, but not be limited to, a palm pilot, a mobile phone and a personal data assistant (PDA).

2. Description of the Related Art

There are many applications that need optical imaging devices to convert paper-based objects, such as texts and graphics, to an electronic format that can be subsequently analyzed, distributed and archived. One of the most popular optical imaging devices are flatbed scanners that typically convert scanning objects, including pictures and papers, to images that can be used for example, for building world wide web pages and optical character recognition. Another emerging optical imaging device is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital format.

FIG. 1 illustrates a cross section of an exemplary image sensing module 100 that is typically used in those image scanners. Image sensing module 100 includes a light source 102, an optical system 108, and an image sensor 110, all are cast in an elongated rectangular tube. When scanning object 120 passes through image sensing module 100, it is illuminated by light source 102 through a window 116. The light reflected by scanning object 120 is then focused through optical path 114 by optical lens system 108 onto image sensor 110. An image of scanning object 120 is therefor generated.

Portable imaging devices containing image sensing module 100 have been used as PC scanners, facsimiles and other multi-function peripherals. However, with the recent explosion of the mobile personal computing market, the demand for effective, mobile internet-connective digital imaging and scanning is increasing at a tremendous rate. Optical imaging devices smaller than the existing sheet-fed type scanners are required in many applications, for example, as an integral part of a palm pilot. An image sensing module is a key component in portable imaging devices. Its dimension is vital to the overall size of the entire imaging device. As shown in FIG. 1, in image sensing module 100, scanning object 120 is perpendicular to optical system 108. With required length of optical path 114, it would be impractical to use an image sensing module as shown in FIG. 1 in a portable imaging device. There is therefore a need for smaller designs of an image sensing module practically suitable for being integrated in portable imaging devices.

SUMMARY OF THE INVENTION

The present invention has been made in consideration of the above described challenge and needs and has particular applications to portable computing devices that may include, but not be limited to, a palm pilot, a mobile phone and a personal data assistant (PDA).

According to one aspect of the present invention, distinct designs are provided to reduce dimensions of an image sensing module without affecting the sizes of the original individual components in the image sensing module. According to one embodiment, a mirror is mounted before an optical focus system and used to collect and redirect reflected light from a scanning object being illuminated by an illumination source in the image sensing module. In this configuration, the scanning object can be placed parallel to the optical lens system. The resultant image sensing module is much slimmer compared to the existing image sensing module.

According to another embodiment of the present invention, the image sensing module comprises an elongated rectangular case or tube. The components, such as an image sensor, an illumination source and an optical lens system, are placed at an angle in the elongated rectangular case such that the size of the elongated rectangular case is minimized without affecting the size of the components. The new configuration results in an image sensing module of reduced size and particularly suitable for the portable computing devices equipped with image scanning capability.

Accordingly, an important object of the present invention is to provide generic solutions for an image sensing module of reduced size.

Other objects, together with the foregoing are attained in the exercise of the invention in the following description and resulting in the accompanying drawings.

BRIEF DESCRIPTION OF THE DRAWINGS

These and other features, aspects, and advantages of the present invention will become better understood with regard to the following description, appended claims, and accompanying drawings where:

FIG. 4 shows a side view of a portion of a portable computing device equipped with image scanning capability using an image sensing module of the present invention.

DETAILED DESCRIPTION OF THE INVENTION

The invention pertains to improved designs of image sensing modules suitable for being integrated in portable computing devices that may include, but not be limited to, personal data assistant (PDA), mobile phones and palm computing devices. With the employment of the current invention, it is now possible to equip the portable computing devices with a scanning capability that may, in many cases, alleviate the inputting dilemma commonly seen on the portable computing devices. For example, a Palm Pilot requires a user to enter data by writing letters on its small writing pad using a set of special stroking rules. It is indeed tedious and laborious to input a long text. With an integrated scanning mechanism employing the image sensing module of the present invention, it is possible to scan in a long text without too much effort.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2:
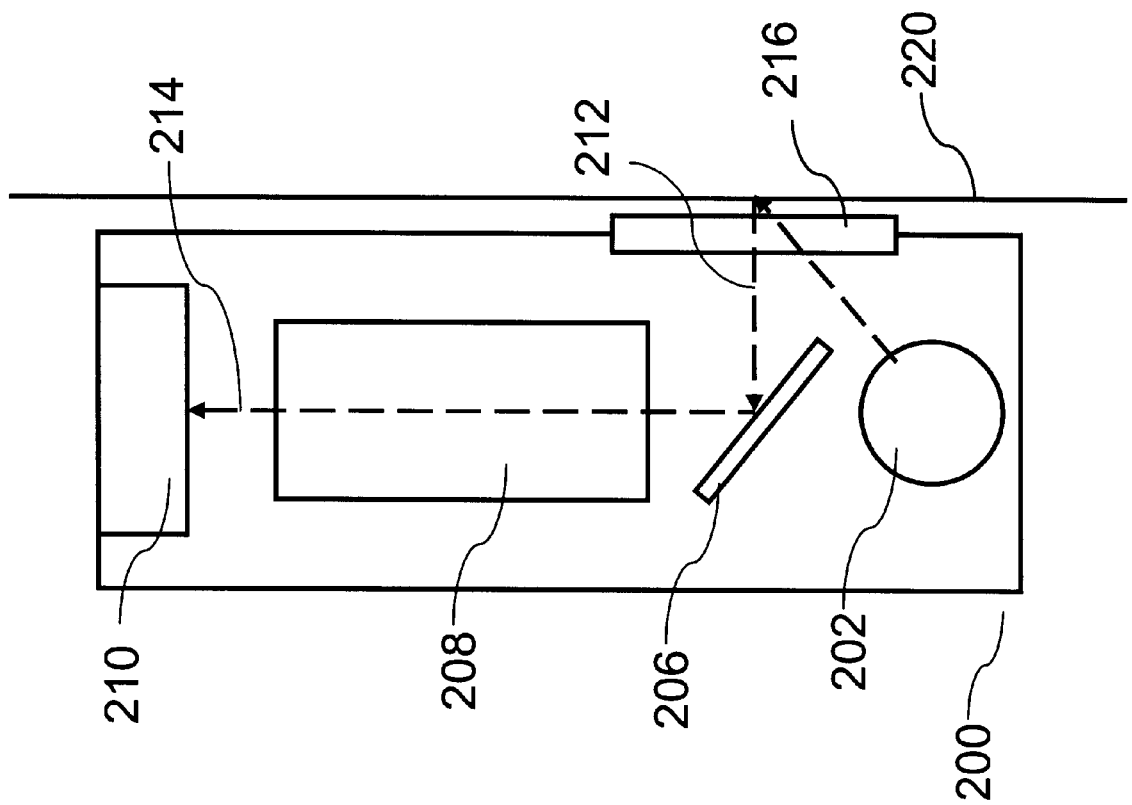
FIG. 2 shows a cross-section view of an image sensing module according to one embodiment of the present invention.

Referring now to the drawings, in which like numerals refer to like parts throughout the several views. FIG. 2 illustrates a side view of an image sensing module according to one embodiment of the present invention. As shown in the figure, image sensing module 200 comprises an illumination source 202, a mirror 206, an optical lens system 208, and an image sensor 210. Depending on an exact implementation illumination source 202 may be a monochromatic light or 3 different color lights (e.g. a set of Red, Green or Blue light emitting diodes). Mirror 206 is used to redirect light path. In one embodiment, optical lens system 208 is an array of rod lens. Image sensor 210 may be 1-Dimensional or 2-Dimensional photodetectors based on CCD or CMOS technologies. From the description herein, it will be evident to those skilled in the art to understand how to integrate the parts (i.e. 202, 206, 208 and 210) in an elongated tube.

Figure 1:
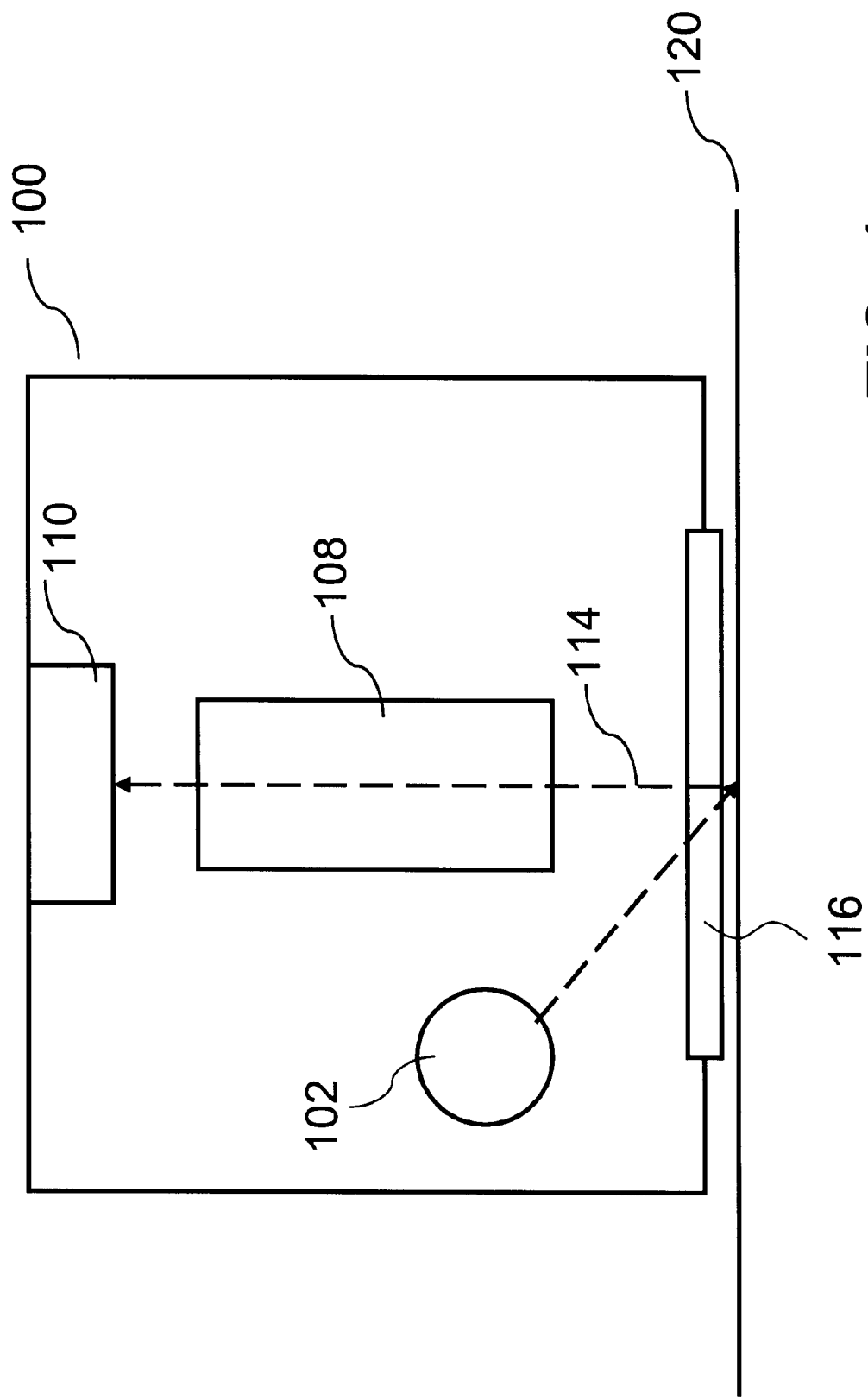
FIG. 1 illustrates a cross section of an image sensing module commonly used in an existing optical scanner.

In one embodiment, image sensing module 200 includes a transparent window 216. When there is a relative movement between scanning object 220 and image sensing module 200, scanning object 220 is illuminated by illumination source 202. After light hits scanning object 220 and is then reflected through optical path 212 onto mirror 206 and further redirected by mirror 206 onto image sensor 210 through optical lens system 208. The reflected light passing through optical path 212 is imaged by image sensor 210. Different from the image sensing module shown in FIG. 1, one of the important features of the present invention is that the reflected lights from the scanning object is redirected by the mirror. As a result, it is possible to design a slim image sensing module and scan the scanning object parallel to optical lens system 208.

Figure 3:
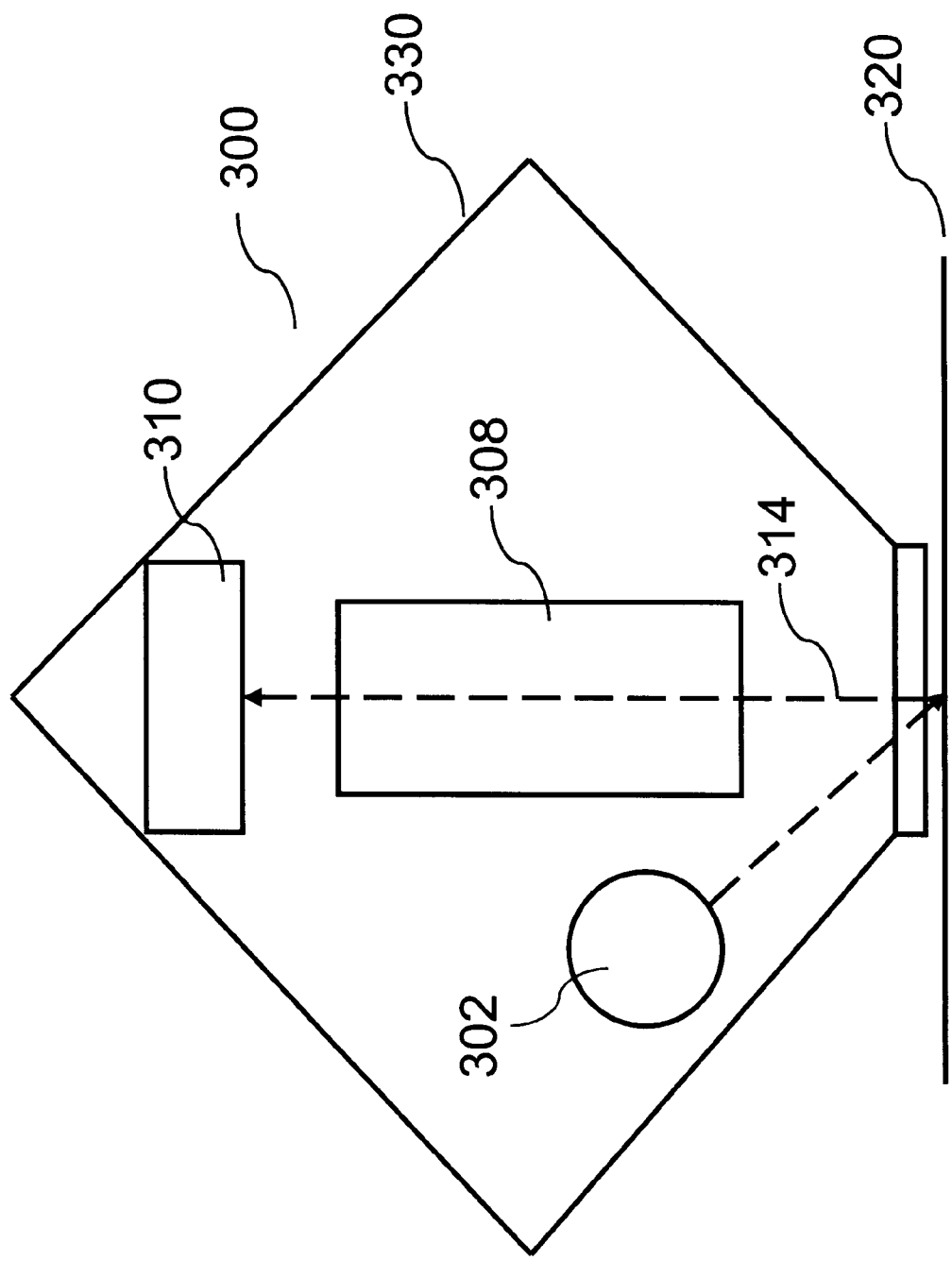
FIG. 3 shows a cross-section view of an image sensing module according to another embodiment of the present invention.

FIG. 3 illustrates a cross-section view of another image sensing module according to one embodiment of the present invention. As shown in the figure, image sensing module 300 comprises an illumination source 302, an optical lens system 308 and an image sensor 310, all cast in an elongated rectangular tube 330. Instead of placing illumination source 302, optical lens system 308 and image sensor 310 squarely in elongated rectangular tube 330, they are now placed diagonally inside elongated rectangular tube 330. According to one embodiment, illumination source 302, optical lens system 308 and image sensor 310 are placed at around 45 degree. As a result, the overall size of the image sensing module could be reduced by about 30% (i.e. 0.707:1) provided to maintain the same illumination source, optical lens system and image sensor. This configuration is very desirable for integration with portable devices such as palm pilots.

Referring now to FIG. 4, there is shown a side view of a portion of a portable computing device 400 that is equipped with image scanning capability. A user can now scan in, for example, a business card. It is generally convenient and customary to hold such portable computing device tilted when scanning a scanning object 402 across. Although it is possible to still employ a regular image sensing module, such as the one in FIG. 1, to accommodate the tilting scanning position, it would be mechanically difficult or at least inefficient to integrate such image sensing module in the portable computing device. As shown in the figure, a improved image sensing module 404, such as the example in FIG. 3, can be conveniently integrated at the end of portable computing device 400 and at the same time provide the tilting scanning position when scanning a scanning object 402. According to one embodiment, a roller 406 is provided. The roller 406 rotates when portable computing device is caused to move across scanning object 402. Roller 406 may be coupled to an encoder (not shown) to record the motion to synchronize the image scanning by image sensing module 404.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. An image sensing module for scanning a scanning object, the image sensing module comprising:

a housing having a crossing section having a shape being rectangular, the housing having an elongated opening along one of corners of the housing;

an image sensor;

an optical system mounted before the image sensor;

an illumination source providing illumination to the scanning object through the elongated opening;

wherein the image sensor, the optical system and the illumination source are collectively packed as an integrated part positioned at an angle in reference to the housing such that dimensions of the housing are minimized without affecting original dimensions of the image sensor, the optical system and the illumination source; and wherein, when the image sensing module is integrated at an end of a portable computing device that is hold tilted with respect to the scanning object, the illumination source projects light onto the scanning object through the elongated opening, the optical system collects conveniently reflected light from the scanning object through the elongated opening and subsequently focuses the reflected light onto the image sensor to generate an image signal of the scanning object.

2. The image sensing module of claim 1, wherein the angle is about 45 degree with respect to the housing.

3. An image sensing module for scanning a scanning object, the image sensing module comprising:

a sensing part including an image sensor, an optical system and an illumination source;

an elongated housing having an elongated opening along one of corners of the elongated housing, the sensing part placed in the elongated housing at a tilted position such that dimensions of the housing can be minimized without affecting original dimensions of the image sensor, the optical system and the illumination source, and wherein, when the image sensing module is integrated at an end of a portable computing device that is hold tilted with respect to a scanning object, the illumination source projects light onto the scanning object through the elongated opening, the optical system collects conveniently reflected light from the scanning object through the elongated opening and subsequently focuses the reflected light onto the image sensor to generate an image signal of the scanning object.

4. The image sensing module of claim 3, wherein the angle is about 45 degree.

* * * * *